United States Patent [19]
Mauer

[11] 3,725,779
[45] Apr. 3, 1973

[54] APPARATUS FOR TESTING THE ELECTRICAL CONDUCTIVITY OF FILAMENTS

[76] Inventor: Gerhard Mauer, An der Teichbreite 6, 318 Wolfsburg, Germany

[22] Filed: Nov. 27, 1970

[21] Appl. No.: 93,159

[30] Foreign Application Priority Data

Nov. 29, 1969  Germany.....................P 19 60 103.7

[52] U.S. Cl. ....................................................324/51
[51] Int. Cl. .............................................G01r 31/02
[58] Field of Search ..........324/51, 52, 66; 340/253 E

[56] References Cited

UNITED STATES PATENTS

| 2,935,676 | 5/1960 | Keltz | 324/158 D UX |
| 3,200,392 | 8/1965 | Chumakov | 340/253 E |
| 3,303,400 | 2/1967 | Allison | 324/158 D X |
| 3,590,371 | 6/1971 | Shaw | 324/51 |
| 2,744,237 | 5/1956 | Polcuch | 324/51 |
| 2,698,921 | 1/1955 | Wharton | 324/52 |
| 3,289,076 | 11/1966 | Edis et al. | 324/52 |
| 2,789,268 | 4/1957 | Bechtel | 324/66 |
| 3,076,931 | 2/1963 | Jasper | 324/66 |

*Primary Examiner*—Gerard R. Strecker
*Attorney*—Watson, Cole, Grindle & Watson

[57] ABSTRACT

Apparatus for testing filaments embedded in a material in which the filaments are connected to alternating voltage current and the alternating fields produced by the alternating currents are measured as flowing through the individual filaments by means of induction coils to which a signal transmitter and recorder are connected.

1 Claim, 2 Drawing Figures

INVENTOR
Gerhard Mauer
BY
Watson, Cole, G'ilo + Watson
Attys.

APPARATUS FOR TESTING THE ELECTRICAL CONDUCTIVITY OF FILAMENTS

This invention relates to apparatus for testing the continuity of parallel switched filaments which are embedded in a material for exaMple in the rear window of a passenger car. A standard measurement of resistance is not to be considered here, since in the case of parallel switched filaments embedded in the glass plate, only a checking of the total resistance is possible. This total resistance does not deliver a reliable recording concerning the individual filaments because of the small resistance of the individual filaments (a few Ohm), of the tolerances this resistance and of the material as well as of the uncertainty in the case of contact change overs or transitions. It is an object of this invention to check electrical conductivity by a contactless method characterized by the fact that the filaments are connected to AC voltages, and the magnetic alternating fields produced by the alternating currents flowing through the individual filaments are registered by means of induction coils with which a signal transmitter is connected. The occurrence of the induction voltage or the lack thereof is used therefore, for example for a recording in the case of an electric interruption of the filament. This contactless testing method makes possible a reliable recording concerning the state of the individual filaments.

Further objects of the invention will be apparent from the following description when considered in connection with the accompanying drawing in which.

Figure 1:
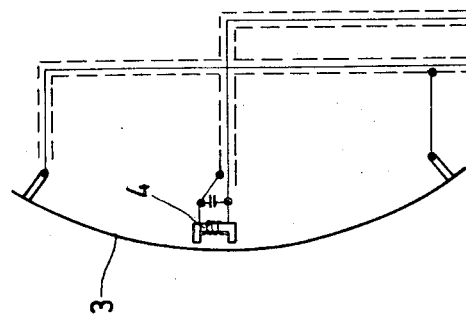
FIG. 1 is a circuit diagram.
Figure 1:
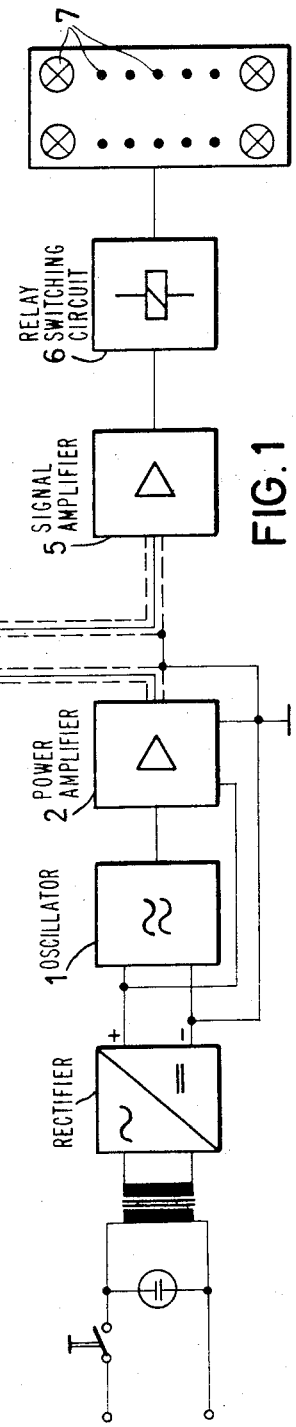

FIG. 1 shows a basic circuit diagram of the testing apparatus in which a stably adjusted low frequency oscillator 1 delivers an alternating voltage with a frequency of approximately 10 kHz. The load side power amplifier 2 delivers a sufficiently high power of approximately 20 watts for the filaments 3 only one of which is shown, and the alternating currents flowing through the filaments produce magnetic alternating fields around these filaments with these fields occurring only if the pertinent filament has electric conductivity. In tuned coils 4, only one of which is shown, these alternating fields induce voltages which switch the relay circuit 6 by means of the measuring amplifier 5. Bulbs 7 which are switched by the relays in relay circuit 6 show the condition of the individual filament, whereby for example, the bulbs in the right-hand column indicate a defect in the filament while flashing of the bulb in the left-hand column indicates that the corresponding filaments have current passage.

Figure 2:
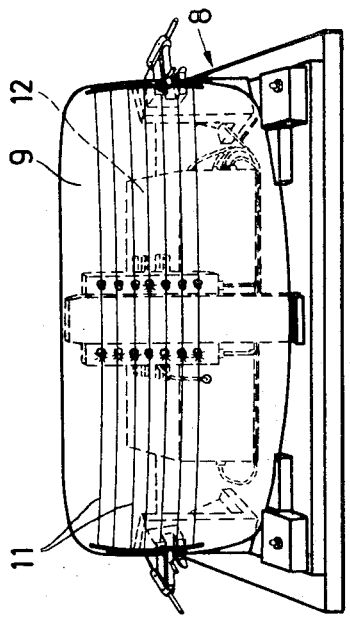
FIG. 2 is a side view of the supporting device for mounting the sensing coils.

FIG. 2 shows a supporting device 8 for the rear window or tail window 9 of a motor vehicle. The test lamps are attached each time at the level of the individual filaments 11.

The electronic part of the measuring instrument 12 has been built up with transistors on printed circuit cards so that a quick repair is possible. The instrument is simple to operate and makes possible a quick and reliable control of the individual filaments.

The series of heating wires 11 can be placed near, adjacent or embedded in any window or glass plate of a motor vehicle. As so embedded the resistance wires 11 when energized, will heat the plate or window to prevent water freezing thereon and to prevent the accumulation of snow, hail and sleet on the window.

I claim:

1. Apparatus for testing the electrical conductivity of a number of filaments embedded in a material, comprising:

means for supplying alternating current to said electrical filaments in parallel;

a number of induction coils mounted adjacent said material and each positioned with respect to an individual one of said filaments to detect the flow of current therein;

means responsive to said number of induction coils for recording the conductivity or non-conductivity of said electrical filaments, said means for recording includes a first and second array of bulbs, each array having a number of bulbs corresponding to said number of electrical filaments and each bulb associated with a corresponding filament wherein said first array indicates non-conductivity and said second array indicates conductivity of said filaments; and switching means actuated by individual ones of said number of coils for actuating an individual one of the bulbs in said first or second array of bulbs.

* * * * *